Figure 1:
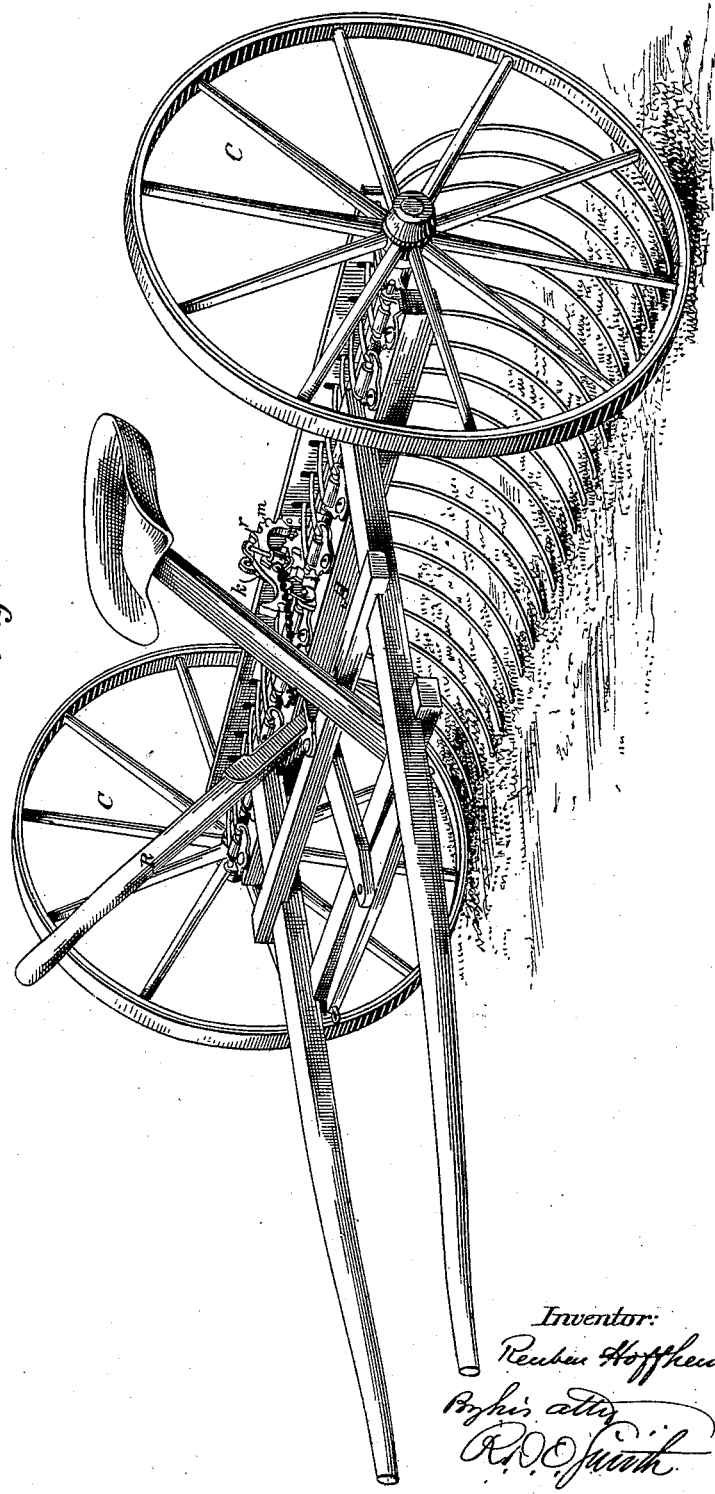
Figure 2:
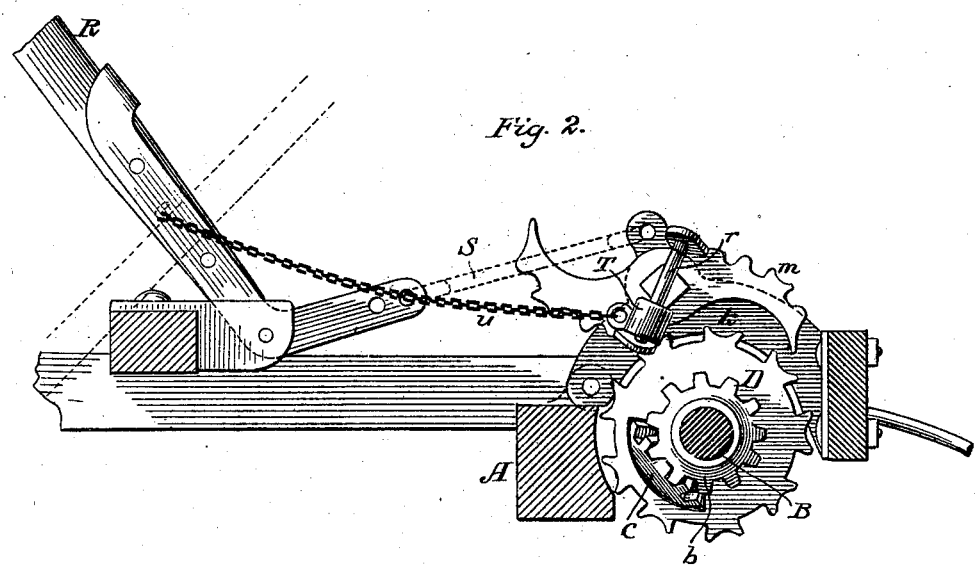
Figure 3:
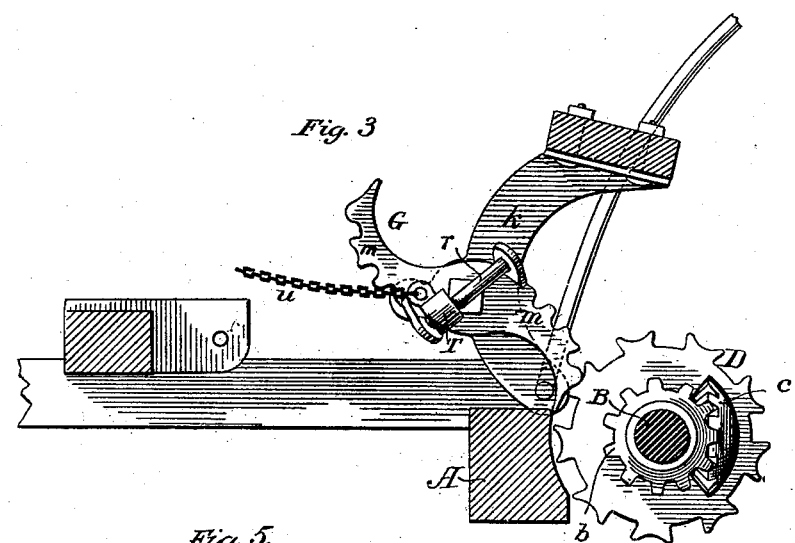
Figure 5:
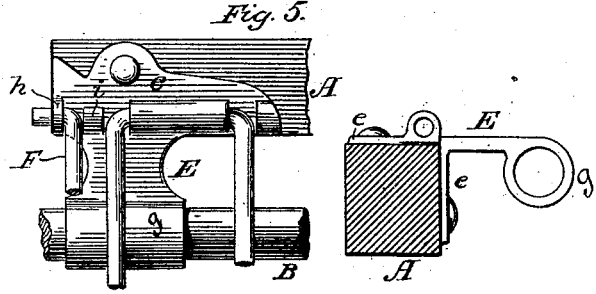
Figure 4:
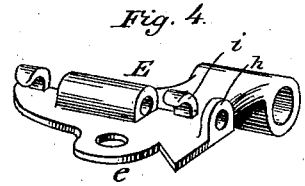

(No Model.) 2 Sheets—Sheet 1.

R. HOFFHEIN.
HORSE HAY RAKE.

No. 247,825. Patented Oct. 4, 1881.

Witnesses:
J. C. Turner

Inventor:
Reuben Hoffhein
By his atty (No Model.) 2 Sheets—Sheet 2.

R. HOFFHEIN.
HORSE HAY RAKE.

No. 247,825. Patented Oct. 4, 1881.

Attest:
J. C. Turner
W. Chaffee

Inventor:
Reuben Hoffhein
By his atty
R. D. Smith

UNITED STATES PATENT OFFICE.

REUBEN HOFFHEIN, OF YORK, PENNSYLVANIA.

HORSE HAY-RAKE.

SPECIFICATION forming part of Letters Patent No. 247,825, dated October 4, 1881.

Application filed March 1, 1881. (No model.)

*To all whom it may concern:*

Be it known that I, REUBEN HOFFHEIN, of York, in the county of York and State of Pennsylvania, have invented new and useful Improvements in Horse Hay-Rakes; and I do hereby declare that the following is a full and exact description of the same.

This invention relates to that class of horse-rakes wherein the rake is raised to discharge its load by bringing it into engagement with the main wheel, so that the propelling power of the horse will also bear the labor of raising the rake. Heretofore when the rake has been raised by these means and the lifting mechanism disconnected from the main wheel it has been permitted to fall back to its working position, influenced by gravity only; and it has been found that this return movement has not always been sufficiently prompt, and thus hay would remain unraked just in front of the windrow.

The principal object of my invention is to render the elevation and return movements equally positive by continuing the operative connection between the main wheel and the rake throughout the upward and downward movements of the rake.

It therefore consists, principally, in a revolving or double pawl or elliptical gear, or similar mechanism, mounted upon the rake-head, and a gear or rack rotated by the main wheel, whereby when said pawl has been caused to engage with said gear or rack the rake will be caused to tilt or be raised up until said pawl has passed its longer axis, when the continued forward rotation of the gear or rack will cause a reverse movement of the rake, and the latter will be regulated in its descent to the ground again by the same positive power which caused it to rise.

That others may fully understand my invention, I will more particularly describe it, having reference to the accompanying drawings, wherein—
Figure 1 is a perspective view of my machine. Figs. 2 to 5 represent details and modifications.

A is the rake-head frame, which is mounted upon and supported by the main axles B B, the outer ends whereof are fixed in the hubs of the main wheels C C.

The axles B B are preferably divided at the middle and connected with the central gear or rack, D, by means of the two bevel-pinions $b\ b$, secured to the inner ends of the axle, respectively, and the pinion $c$, mounted on a radial pin within the periphery of the gear or rack D. This structure is adopted to render the two main wheels independent drivers, and cause the device to be operative while turning at the corners, or at other times when the two wheels do not revolve with equal speed; but this particular structure is not necessary to my invention, which would be equally operative if the rack or gear D should be coupled with the main axle in any other manner heretofore practiced.

The bearings of the axle B at the ends of the frame A are in brackets E, each of which is provided with flanges $e\ e$ to inclose separate sides of the frame A, and with a perforated arm, $g$, to form the axle-bearing, and with the lugs $h\ i$ to form a socket for the end tooth, F, of the series.

In line with the lugs which form the tooth-sockets and interposed between them there are hooking lugs, which prevent the removal of the teeth, except when they are bent backward in their sockets sufficiently far to permit them to slip under the curved ends of said hooks.

The double-ended pawl G is mounted upon a center pin or axis in a bracket, $k$, attached to the rake-head frame A opposite to the rack or gear D, and in a position to engage therewith when the extended end of the same is depressed. The pawl G is provided on its back with gear-teeth in corresponding pitch with the teeth of the rack D, so that when said pawl has engaged with said rack and the engaging point has been carried by said gear forward past the median line between their respective centers the teeth $m$ will engage with the teeth of the rack D, and will regulate the descent of the rake to its working position.

A traveler-rod, $r$, is placed on the side of the pawl G across its axis and supported by being attached at its ends to said pawl. A weighted traveler, T, is placed on said rod, and is free to slide thereon from end to end. The traveler T carries an eye or loop, to which may be attached the chain $u$, whereby the pawl G may be caused to partly rotate and engage with the rack D. To so actuate the pawl G by a pull requires that the force shall always be applied below the center of revolution, and the attachment of the chain to the traveling weight T secures that object, because when said pawl has been rotated by the rack D and has been released it is always left with the rod $r$ nearly vertical in position, and the weight T will immediately slide down to the lower end in proper position for the next action. The weight T also serves to poise the pawl and maintain it in proper position of rest until its time for action arrives.

The hand-lever R serves as a convenient means for operating the pawl G. By means of a hook-rod, S, the said lever may be connected directly with the rake-bracket K, and the rake may thereby be raised from the ground and so maintained during transportation.

Having described my invention, what I claim as new is—

1. The axle-box, tooth-holder, and rake-head holder, all cast in a single piece, adapted to conform to the sides of the rake-head, as shown and described.

2. The broad concave-faced tooth on the center wheel, combined with the pawl having corresponding projection, whereby the rake is held up while passing from the movement in elevation to the movement in descent.

3. The double-ended cam G, with notches corresponding with the teeth of the center wheel, D.

4. The center wheel, D, combined with a double-ended revolving cam, substantially as set forth.

5. The double-ended cam G and the center wheel, D, combined with the series of gear-wheels $b\ b\ c$, intermediate between said center wheel and the adjacent ends of the main axle.

6. The double-ended revolving cam G, provided with a transverse loop-rod, combined with a traveling ring and its flexible connection, whereby the cam may be at any time brought into engagement.

7. In a horse hay-rake, the combination of a continually-revolving axle cut in two parts at or near the center of the rake, the two parts being connected at their inner ends to the lifting-wheel by a train of gear-wheels, so that each part of the axle can turn independently of each other when the rake is turning round and act in conjunction when lifting the teeth, while the outer ends are rigidly connected to the supporting-wheel, and a lifting device under the control of the operator, that will lift the teeth to pass over the windrow and reset them gradually by the draft of the team, thereby preventing the teeth from falling to the ground.

8. In a horse hay-rake, the combination of a revolving axle, a center lifting-wheel, and a device to raise the teeth and reset them automatically, as described.

9. In a horse hay-rake, a lifting and resetting device by which the teeth are raised to discharge the gathered load and gradually reset automatically to gather a fresh load.

10. A horse-rake having a revolving axle, a center ratchet or gear wheel mounted upon or driven by said axle, and a hinged rake-head, combined with a revolving double-ended pawl provided with gear-teeth and mounted on said rake-head, so that it may be caused to engage with said ratchet at will, whereby the rake may be automatically lifted from the ground and lowered again by positive power derived from the continuous motion of said axle.

REUBEN HOFFHEIN.

Witnesses:
CHAS. H. CARROLL,
JAS. H. BLASSER.